United States Patent
Chen

(10) Patent No.: US 7,690,098 B2
(45) Date of Patent: Apr. 6, 2010

(54) METHOD OF MANUFACTURING A FACE WITH DIFFERENT THICKNESS DISTRIBUTION

(75) Inventor: Archer C. C. Chen, Taichung (TW)

(73) Assignee: Cindy Rhodes, Taichung (TW)

( * ) Notice: Subject to any disclaimer, the term of this patent is extended or adjusted under 35 U.S.C. 154(b) by 396 days.

(21) Appl. No.: 11/723,089

(22) Filed: Mar. 16, 2007

(65) Prior Publication Data
US 2008/0040910 A1    Feb. 21, 2008

Related U.S. Application Data

(63) Continuation-in-part of application No. 11/504,067, filed on Aug. 15, 2006.

(51) Int. Cl.
*B23P 13/04* (2006.01)
(52) U.S. Cl. .......................... 29/557; 473/329; 473/330; 473/350
(58) Field of Classification Search .................. 29/557; 473/329, 330, 342, 349, 350
See application file for complete search history.

(56) References Cited

U.S. PATENT DOCUMENTS

| | | | | | |
|---|---|---|---|---|---|
| 2,807,970 | A | * | 10/1957 | Dorman | 72/340 |
| 3,566,513 | A | * | 3/1971 | Fuller | 29/557 |
| 6,145,365 | A | * | 11/2000 | Miyahara | 72/332 |
| 6,966,848 | B2 | * | 11/2005 | Kusumoto | 473/342 |
| 2001/0018792 | A1 | * | 9/2001 | Miyahara | 29/557 |

* cited by examiner

*Primary Examiner*—David P Bryant
*Assistant Examiner*—Christopher M Koehler
(74) *Attorney, Agent, or Firm*—Browdy and Neimark, PLLC

(57) ABSTRACT

A method of manufacturing a face with different thickness distribution is cutting a slice metal board with predestination shape from a metal board and stamping the slice metal board into an uneven metal board with predestination shape of rough and uneven on it then, milling one side of the uneven metal board to produce a board with different thickness. The final step is pressing the metal board with different thickness to form a face with different thickness distribution.

4 Claims, 2 Drawing Sheets

METHOD OF MANUFACTURING A FACE WITH DIFFERENT THICKNESS DISTRIBUTION

CROSS REFERENCE TO RELATED APPLICATIONS

The present application is a continuation-in-part of U.S. application Ser. No. 11/504,067 entitled METHOD OF MANUFACTURE A CUP FACE WITH DIFFERENT THICKNESS DISTRIBUTION filed on Aug. 15, 2006, the disclosure of which is incorporated herein by reference.

BACKGROUND OF THE INVENTION

1. Field of the Invention

The present invention relates to a method of manufacture a golf head and more particularly to a method of manufacturing a face with different thickness distribution.

2. Description of the Related Art

In the prior art, a cup face having a different thickness distribution is usually make made from a metal rod by forging, and the pressure of the forging must be higher than 400 tons. The method will lose about 50% of the raw material. As a result the crystals of the metal will change and the strength of the material is reduced when the temperature is higher than 800° C., so the manufacture temperature must be controlled under 800° C. if the manufacturer wants to use β titanium material to make the face. But, it is difficult to make a metal rod into a face with the thickness between 1.5 to 4 mm by forging under such a low manufacture temperature. Avoiding damage to the face will be difficult to control. As is known, there is a face in a cup shape. It will be more difficult to make a rod into a cup face with the thickness between 1.5 to 4 mm by forging under the low manufacture temperature.

SUMMARY OF THE INVENTION

The object of the present invention is to provide a method of manufacturing a face with different thickness distribution and the product is excellence in quality.

To achieve this object, the method in the present invention comprises: cuffing a slice metal board with predetermined shape from a metal board (like β titanium material or maraging steel) and stamping the slice metal board into an uneven metal board with the predetermined shape of having a deree of roughness and unevenness on it, then, milling one side of the uneven metal board to produce a board with a different thickness.

The advantage of the present invention is using a board material to manufacture the product. The method of present invention loses about 20~30% of the raw material and saves cost. By this method, there is no high-pressure machine needed and the cost of equipment can be saved. It is easy to control the thickness distribution by pressing a flat board first and then milling one side of it. The product quality is excellent. There is one more bending step needed to form cup face.

DETAILED DESCRIPTION OF THE INVENTION

Figures 1, 2:
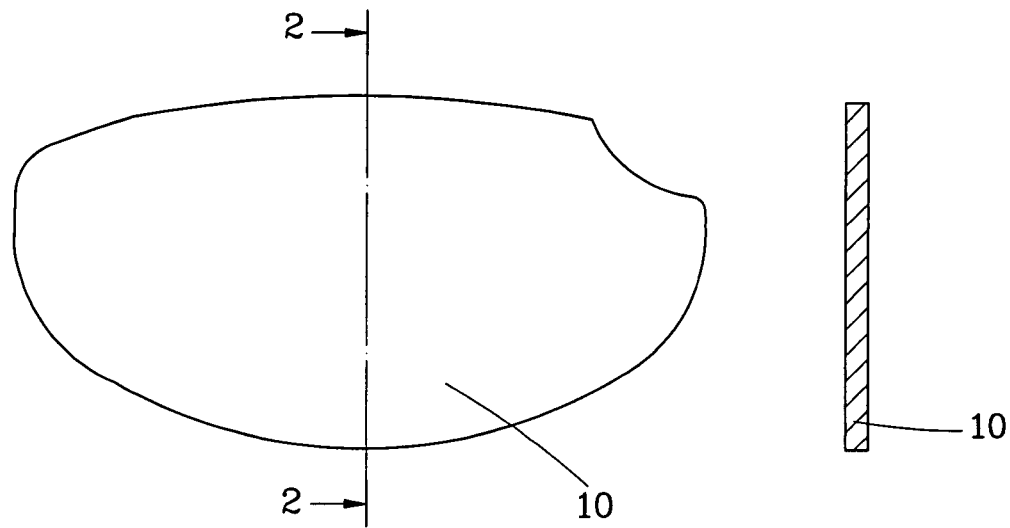
FIG. 1 is a front view of a board that cuts from the first step of the present invention.
FIG. 2 is a section view along the line 2-2 of the FIG. 1.
Figures 3, 4:
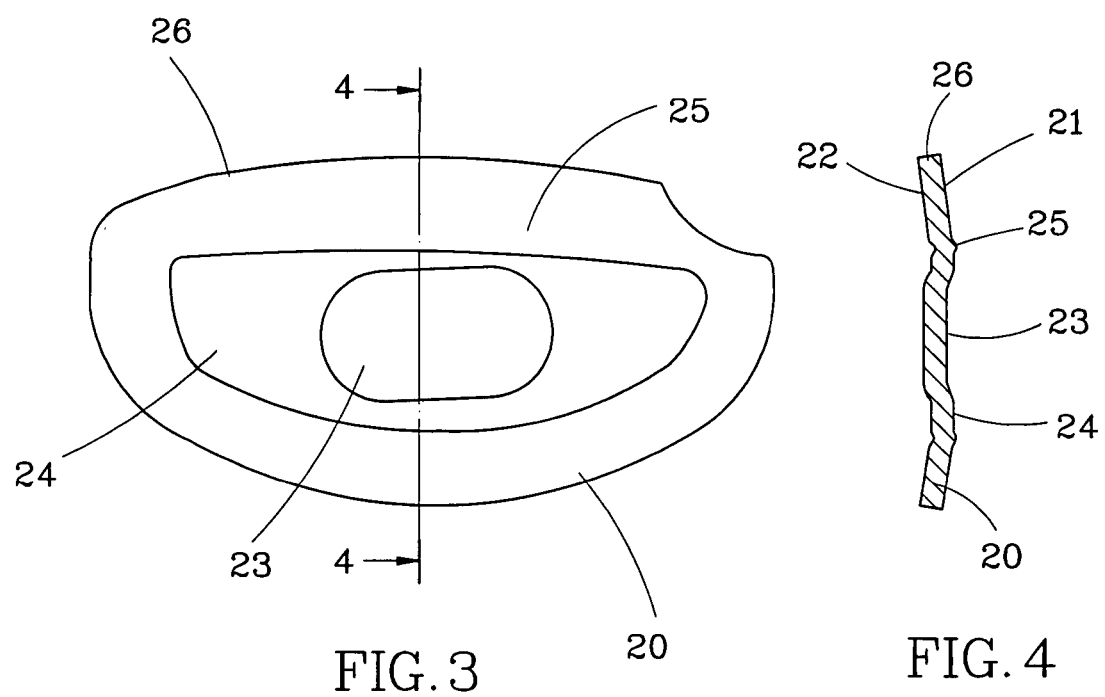
FIG. 3 is a front view of a board with rough and uneven in surface that presses in the b step of the present invention.
FIG. 4 is a section view along the line 4-4 of the FIG. 3.
Figure 5:
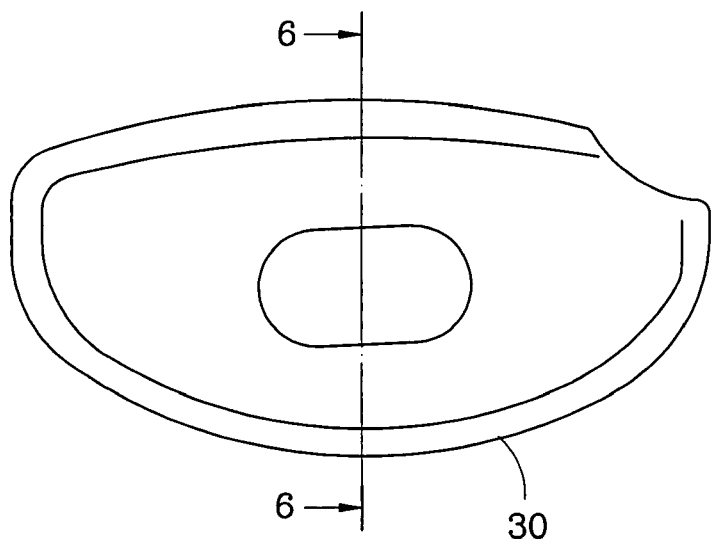
FIG. 5 is a front view of a board with rough and uneven in surface that mills in the c step of present invention.
Figure 6:
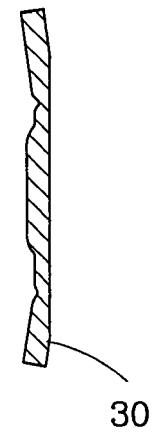
FIG. 6 is a section view along the line 6-6 of the FIG. 5.

Referring to FIG. 1 to 6, a method of manufacturing a face with different thickness distribution of present invention, comprising:

a) Cutting a slice metal board 10 with predetermined shape (the unfold shape of the face) from a metal board (like β titanium material or maraging steel) as shown in FIG. 1 and FIG. 2.

b) Stamping the slice metal board 10 into an uneven metal board 20 with predetermined shape of having roughness and unevenness on it as shows in FIG. 3 and FIG. 4. In order to make the metal board become thinner, the metal board needs to be pressed on the same side.

c) Milling one side of the uneven metal board 20 to produce a board with different thickness as shows in FIG. 5 and FIG. 6. This step mills the protruding side 21 of the uneven metal board 20 and makes the protruding side flat. This step makes the uneven metal board 20 become a metal board 30 with different thickness.

The step b involves pressing the central portion 23 of the metal board 20 to another side 22. The flat portion 24 is almost flat. The rising portion 25 around the flat portion 24 protrudes to the protruding side 21. The step c comprises milling the protruding side 21 even with the un-milled central portion 23 as shown in FIG. 5 and FIG. 6. The central portion 23 keeps the original thickness of the board and the flat portion 24 is milled to be thinner. The rising portion 25 is mostly milled and forms the thinnest portion. The central portion 23 is thickest and forms the center portion of the face.

The present invention provides simple cutting, stamping, milling and forging steps and makes a flat board to become a face with different thickness. The steps of present invention are simple and no more expensive equipment is needed. The method of present invention can operate at a low temperature without breaking the strength of the material. The product can be excellent in dimension and good quality. The method of present invention also saves raw material and cost.

Figure 7:
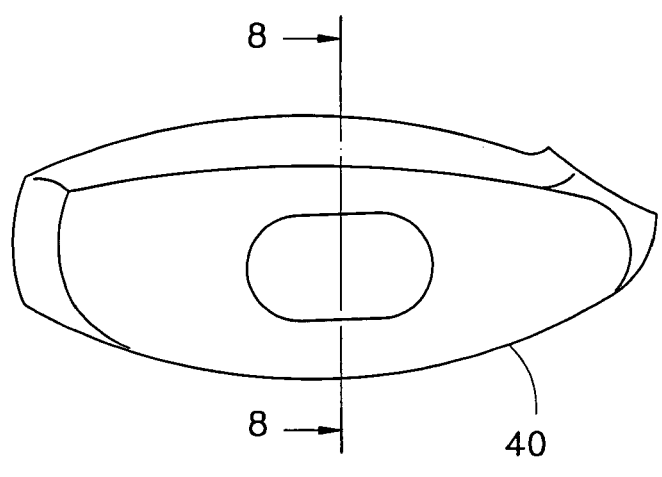
FIG. 7 is a front view of a cup face in the d step of present invention.
Figure 8:
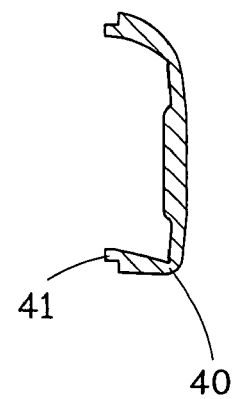
FIG. 8 is a section view along the line 8-8 of the FIG. 6.

Referring to FIG. 7 and FIG. 8, these figures show the cup face in the second embodiment of present invention. The second embodiment follows the first embodiment, so the first three steps are the same. The difference between the first embodiment and the second embodiment is a step d that adds in the second embodiment. The step d is pressing the uneven slice metal board that makes from the step c into a cup shape as show in FIG. 7 and FIG. 8 to form a cup face 40 with different thickness distribution. Then, milling partial edge of the cup face 40 to from a protrudent portion 41 for a following combination process. The central portion 23 forms the center portion of the cup face. The metal board will be bended at the most thinnest rising portion 25 to form the cup shape. In order to form the protrudent portion 41, the edge portion 26 still keep the thickness of the metal board.

What is claimed is:

1. A method of manufacturing a metal face with a different thickness distribution, comprising:

a) cutting a slice metal board with a predetermined shape from a metal board;

b) stamping the slice metal board into an uneven metal board with the predetermined shape having roughness and unevenness thereon; and
c) milling a first side of the slice metal board to produce a board with different thickness,
wherein step b) comprises forming on the slice metal board a central portion, a flat portion around the central portion, and a rising portion around the flat portion;
wherein the central portion protrudes towards a second side and the rising portion protrudes towards the first side of the slice metal board, and
wherein step c) comprises milling the first side so that the flat portion and the rising portion are even with the central portion on the first side.

2. The method as claimed in claim 1, further comprising:
d) pressing the slice metal board into a cup shape after step c) to form a cup face with a different thickness distribution.

3. The method as claimed in claim 1, wherein step b) further comprises forming an outmost flange around an outer periphery of the rising portion, wherein the outmost flange bends toward the second side.

4. The method as claimed in claim 3, wherein step c) further comprising milling the outmost flange on the first side so that an inner portion thereof close to the central portion is milled and an outer portion thereof close to the periphery of the outmost flange is not milled.

* * * * *